(12) United States Patent
Manolakos et al.

(10) Patent No.: US 11,716,701 B2
(45) Date of Patent: Aug. 1, 2023

(54) ESTIMATING AND REPORTING OF SIDE-INFORMATION FOR ENHANCED RECIPROCAL SIGNALING-BASED POSITIONING

(71) Applicant: QUALCOMM Incorporated, San Diego, CA (US)

(72) Inventors: Alexandros Manolakos, Escondido, CA (US); Lorenzo Ferrari, Oakland, CA (US); Taesang Yoo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 57 days.

(21) Appl. No.: 17/009,157

(22) Filed: Sep. 1, 2020

(65) Prior Publication Data

US 2021/0105737 A1    Apr. 8, 2021

Related U.S. Application Data

(60) Provisional application No. 62/910,269, filed on Oct. 3, 2019.

(30) Foreign Application Priority Data

Oct. 2, 2019    (GR) .............................. 20190100429

(51) Int. Cl.
*H04W 64/00*    (2009.01)
*H04B 7/06*    (2006.01)
(Continued)

(52) U.S. Cl.
CPC ............. *H04W 64/006* (2013.01); *G01S 5/10* (2013.01); *H04B 7/0626* (2013.01);
(Continued)

(58) Field of Classification Search
None
See application file for complete search history.

(56) References Cited

U.S. PATENT DOCUMENTS 9,521,664 B2 *   12/2016  Chen ................... H04W 72/042
2015/0382318 A1 *  12/2015  Kim ...................... G01S 5/0054
                                                      455/456.5
(Continued)

OTHER PUBLICATIONS

5G Evolution: A view on 5G Cellular Technology Beyond 3GPP Release 15 (Sep. 6, 2019) (Year: 2019).*
(Continued)

*Primary Examiner* — Yemane Mesfin
*Assistant Examiner* — Jeff Banthrongsack
(74) *Attorney, Agent, or Firm* — Weaver Austin Villeneuve & Sampson LLP

(57) ABSTRACT

Techniques for position estimation using uplink (UL) and downlink (DL) signals via a fully or partially reciprocal wireless channel between a User Equipment (UE) and terrestrial transceiver can be enhanced by leveraging information obtained from UL or DL signals having the stronger Signal-to-Noise Ratio (SNR). This information can include the number of paths and/or complex sinusoids, and can be shared with the base station or location server to parameterize the model of the wireless channel. In some embodiments, the UE can further determine a quality metric for the model and send it to the location server or terrestrial transceiver.

34 Claims, 8 Drawing Sheets

(51) Int. Cl.
*H04W 56/00* (2009.01)
*H04L 5/00* (2006.01)
*G01S 5/10* (2006.01)

(52) U.S. Cl.
CPC ......... *H04L 5/0051* (2013.01); *H04W 56/001* (2013.01); *H04W 56/009* (2013.01)

(56) References Cited

U.S. PATENT DOCUMENTS

2017/0332192 A1* 11/2017 Edge .................. H04W 4/02
2019/0053013 A1   2/2019 Markhovsky et al.

OTHER PUBLICATIONS

3GPP TSG RAN WG1 #96, DL based NR positioning, Feb. 25-Mar. 1, 2019, R1-1901847 (Year: 2019).*

Amitabha G., et al., "5G Evolution: A, View on 5G Cellular Technology Beyond 3GPP, Release 15", IEEE Access, vol. 7, Sep. 6, 2019 (Sep. 6, 2019), pp. 127639-127651, XP011746509, DOI: 10.1109/ACCESS.2019.2939938, [retrieved on Sep. 16, 2019], fig 15, p. 127646.

Humphrey D., et al., "Super-Resolution Time of Arrival for Indoor Localization", IEEE International Conference on Communications. 2008: ICC 2008; Beijing, China, Piscataway, NJ, USA, May 19-23, 2008, XP031265939, pp. 3286-3290, XP031265939.ISBN: 978-1-4244-2075-9.

International Search Report and Written Opinion—PCT/US2020/049063—ISA/EPO—dated Nov. 18, 2020.

Nokia, et al., "DL Based NR Positioning", 3GPP Draft; R1-1901847 Downlink Based NR Positioning, 3rd Generation Partnership Project (3GPP), Mobile Competence Centre, 650, Route Des Lucioles; F-06921 Sophia-Anti Polis Cedex; France, vol. RAN WG1, No. Athens, Greece; Feb. 25, 2019-Mar. 1, 2019, Feb. 15, 2019 (Feb. 15, 2019), XP051599540, Retrieved from the Internet: URL: http://www.3gpp.org/ftp/tsg%5Fran/WG1%5FRL1/TSGR1%5F96/Docs/R1%2D1901847%2Ezip [retrieved on Feb. 15, 2019], p. 2.

* cited by examiner

ESTIMATING AND REPORTING OF SIDE-INFORMATION FOR ENHANCED RECIPROCAL SIGNALING-BASED POSITIONING

RELATED APPLICATIONS

This application claims the right of priority under 35 U.S.C. 119 to Greece Provisional Application No. 20190100429, filed Oct. 2, 2019, entitled "ESTIMATING AND REPORTING OF SIDE-INFORMATION FOR ENHANCED RECIPROCAL SIGNALING-BASED POSITIONING," and U.S. Provisional Application No. 62/910,269, filed Oct. 3, 2019, entitled "ESTIMATING AND REPORTING OF SIDE-INFORMATION FOR ENHANCED RECIPROCAL SIGNALING-BASED POSITIONING" which are assigned to the assignee hereof, and incorporated by reference herein in their entirety.

BACKGROUND

Determining the location of a mobile electronic device (referred to herein as a User Equipment (UE)) using terrestrial transceivers may use signaling between the UE and the terrestrial transceivers. Time Of Arrival (TOA) calculations used in Round-Trip-Time (RTT) or Uplink Time Difference Of Arrival (UTDOA) measurements can be enhanced using super resolution algorithms that model the channel between the UE and terrestrial transceivers using various parameters. Determining these parameters accurately based on uplink (UL) transmissions by the UE, however, can be a challenge.

BRIEF SUMMARY

Techniques for position estimation using UL and downlink (DL) signals via a fully or partially reciprocal wireless channel can be enhanced by leveraging information obtained from the UL or DL signals having the stronger Signal-to-Noise Ratio (SNR). This information can include the number of paths and/or complex sinusoids, and can be shared with the base station or location server to parameterize the model of the wireless channel. In some embodiments, the UE can further determine a quality metric for the model and send it to the location server or terrestrial transceiver.

An example method at a UE of enabling enhanced positioning of the UE using a wireless channel having full or partial reciprocity, according to this description, comprises wirelessly receiving, at the UE, a first reference signal via the wireless channel, wirelessly transmitting a second reference signal from the UE via the wireless channel, and determining one or more values of the wireless channel based on the first reference signal. The one or more values are indicative of a number of distinct paths of the wireless channel, a number of complex sinusoids of the wireless channel, or a quality metric of how well an estimated model represents data received via the wireless channel, or any combination thereof. The example method further comprises providing, with the UE, the determined one or more values.

An example method at a Transmission and Reception Point (TRP) of enabling enhanced positioning of a UE using a wireless channel having full or partial reciprocity, according to this description, comprises wirelessly transmitting a first reference signal via the wireless channel, wirelessly receiving a second reference signal from the UE via the wireless channel, and receiving one or more values indicative of a number of distinct paths of the wireless channel, a number of complex sinusoids of the wireless channel, or a quality metric of how well an estimated model represents data received via the wireless channel, or any combination thereof. The example method further comprises determining a Time Of Arrival (TOA) measurement of the second reference signal based on the one or more values.

A first example device, according to this description, comprises a memory and one or more processing units communicatively coupled with the memory. The one or more processing units are configured to wirelessly receive, via a wireless communication interface of a UE, a first reference signal via a wireless channel having full or partial reciprocity, and wirelessly transmit, via the wireless communication interface, a second reference signal from the UE via the wireless channel. The one or more processing units are also configured to determine one or more values of the wireless channel based on the first reference signal, wherein the one or more values are indicative of a number of distinct paths of the wireless channel, a number of complex sinusoids of the wireless channel, or a quality metric of how well an estimated model represents data received via the wireless channel, or any combination thereof. The one or more processing units are further configured to provide the determined one or more values.

A second example device, according to this description, comprises a memory and one or more processing units communicatively coupled with the memory. The one or more processing units are configured wirelessly transmit, via a wireless communication interface of a Transmission and Reception Point (TRP), a first reference signal via a wireless channel having full or partial reciprocity, and wirelessly receive, via a wireless communication interface of the TRP, a second reference signal from a User Equipment (UE) via the wireless channel. The one or more processing units are also configured to receive one or more values indicative of a number of distinct paths of the wireless channel, a number of complex sinusoids of the wireless channel, or a quality metric of how well an estimated model represents data received via the wireless channel, or any combination thereof. The one or more processing units are further configured to determine a Time Of Arrival (TOA) measurement of the second reference signal based on the one or more values.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
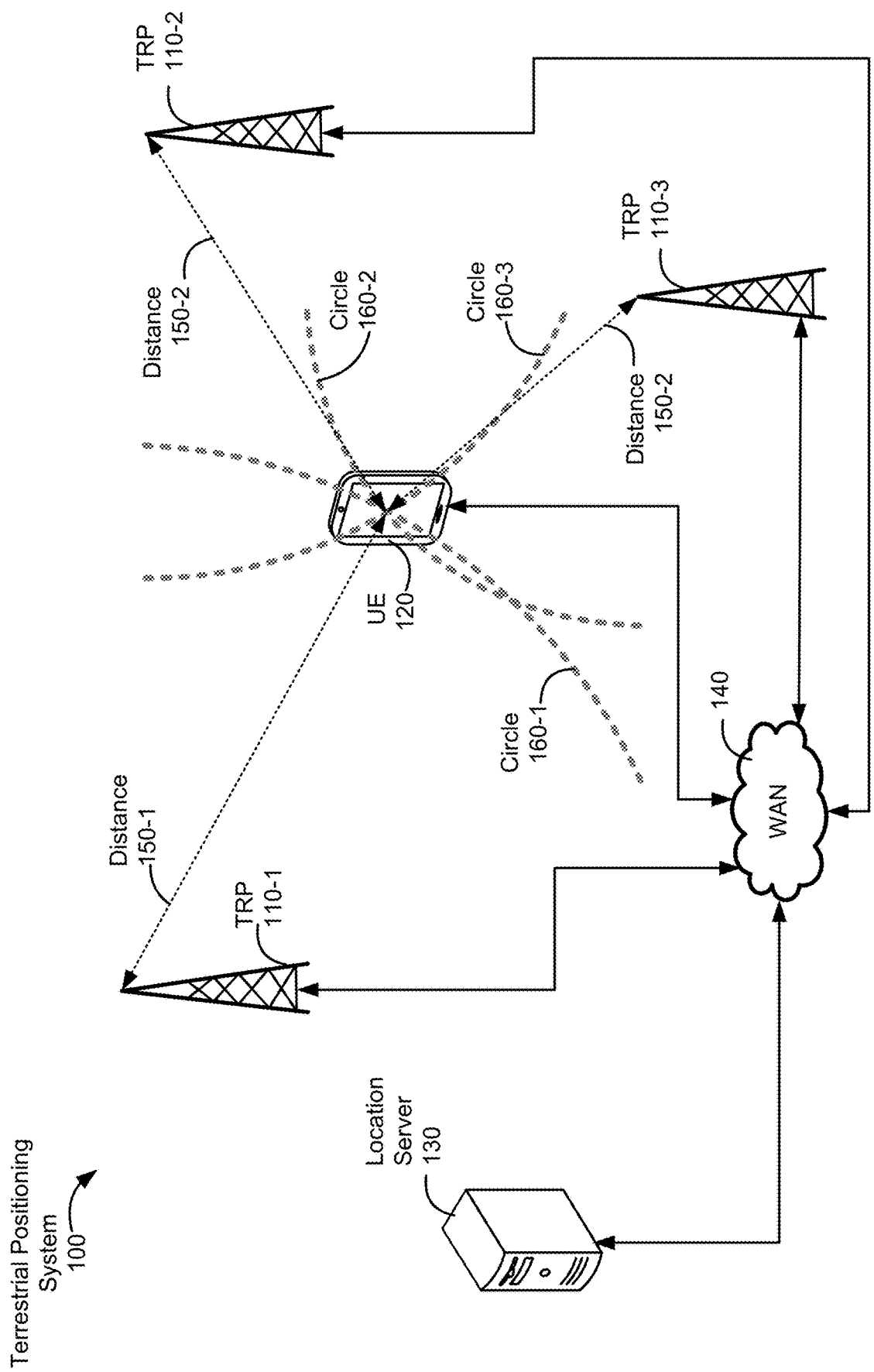
FIG. 1 is a diagram of a terrestrial positioning system, according to an embodiment.

FIG. 1 is a diagram of a terrestrial positioning system 100, according to an embodiment. Here, the terrestrial positioning system comprises multiple terrestrial transceivers, known as Transmission and Reception Points (TRPs) 110-1, 110-2, and 110-3 (generically and collectively referred to herein as TRPs 110), which are used to determine the location (e.g., in geographical coordinates) of a User Equipment (UE) 120. The TRPs 110 and/or the UE 120 both may be communicatively coupled with a location server 130 via a Wide Area Network (WAN) 140. (Solid arrows between components indicate communication links. Further, although the UE 120 may be communicatively coupled with the WAN 140 via wireless communication with one or more of the TRPs 110, the UE 120 may have an additional or alternative communication link to the WAN 140, as illustrated.)

It should be noted that FIG. 1 provides a generalized illustration of various components, any or all of which may be utilized as appropriate, and each of which may be duplicated or omitted as necessary. Specifically, although one UE 120 is illustrated, it will be understood that many UEs (e.g., hundreds, thousands, millions, etc.) may utilize the terrestrial positioning system 100. Similarly, the terrestrial positioning system 100 may include a larger or smaller number TRPs 110, location servers 130, and/or other components. The illustrated communication links that communicatively connect the various components in the terrestrial positioning system 100 include data and signaling connections which may include additional (intermediary) components, direct or indirect physical (wired) and/or wireless connections, and/or additional networks. Furthermore, components may be rearranged, combined, separated, substituted, and/or omitted, depending on desired functionality.

The UE 120, as used herein, may be an electronic device and may be referred to as a device, a mobile device, a wireless device, a mobile terminal, a terminal, a wireless terminal, a mobile station (MS), a Secure User Plane Location (SUPL) Enabled Terminal (SET), or by some other name. Moreover, UE 120 may correspond to a cellphone, smartphone, laptop, tablet, personal data assistant (PDA), tracking device or some other portable or moveable device. In some cases, a UE 120 may be part of some other entity—e.g. may be a chipset supporting a modem that is integrated into some larger mobile entity such as a vehicle, drone, package, shipment, robotic device etc. Typically, though not necessarily, the UE 120 may support wireless communication using one or more Radio Access Technologies (RATs) such as Global System for Mobile communication (GSM), Code Division Multiple Access (CDMA), Wideband CDMA (WCDMA), Long Term Evolution (LTE), High Rate Packet Data (HRPD), Institute of Electrical and Electronics Engineers (IEEE) 802.11 Wi-Fi, Bluetooth® (BT), Worldwide Interoperability for Microwave Access (WiMAX), Fifth Generation (5G) New Radio (NR), etc. The UE 120 may also support wireless communication using a Wireless Local Area Network (WLAN) which may connect to other networks (e.g. the Internet) using a Digital Subscriber Line (DSL) or packet cable for example.

The UE 120 may include a single entity or may include multiple entities such as in a personal area network where a user may employ audio, video and/or data I/O devices and/or body sensors and a separate wireline or wireless modem. An estimate of a location of the UE 120 may be referred to as a location, location estimate, location fix, fix, position, position estimate or position fix, and may be geodetic, thus providing location coordinates for the UE 120 (e.g., latitude and longitude) which may or may not include an altitude component (e.g., height above sea level, height above or depth below ground level, floor level or basement level). Alternatively, a location of the UE 120 may be expressed as a civic location (e.g., as a postal address or the designation of some point or small area in a building such as a particular room or floor). A location of the UE 120 may also be expressed as an area or volume (defined either geodetically or in civic form) within which the UE 120 is expected to be located with some probability or confidence level (e.g., 67%, 95%, etc.) A location of the UE 120 may further be a relative location comprising, for example, a distance and direction or relative X, Y (and, optionally, Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Depending on desired functionality, the WAN 140 may comprise any of a variety of wireless and/or wireline communication networks. The WAN 140 can, for example, comprise any combination of public and/or private networks, local and/or wide-area networks, and the like. Furthermore, the WAN 140 may utilize one or more wired and/or wireless communication technologies. In some embodiments, the WAN 140 may comprise a cellular or other mobile network, a WLAN, a Wireless Wide-Area Network (WWAN), and/or the Internet, for example. Particular examples of a WAN 140 include a Long Term Evolution (LTE) wireless network, a 5G wireless network (also referred to as an NR wireless network), a Wi-Fi WLAN and the like. LTE, 5G and NR are wireless technologies defined, or being defined, by the $3^{rd}$ Generation Partnership Project (3GPP). WAN 140 may also include more than one network and/or network type.

Transceivers 110 may comprise nodes in wireless communication network, which may allow the UE 120 to communicate wirelessly with other devices linked to the WAN 140. The TRPs 110 may, for example, comprise base stations in a cellular network, access points (APs) in a Wi-Fi network, and/or other wireless devices with known locations. As described in further detail below, techniques are not necessarily limited to fixed TRPs (i.e., TRPs having a fixed position), but may also include mobile TRPs and even other UEs 120. Depending on the technology of the WAN 140, TRPs 110 may comprise a node B, an Evolved Node B (eNodeB or eNB), a base transceiver station (BTS), a radio base station (RBS), an NR NodeB (gNB), a Next Generation eNB (ng-eNB), a Wi-Fi AP, and/or a Bluetooth® AP. Thus, UE 120 can send and receive information with network-connected devices, such as location server 130, by accessing the WAN 140. And, as noted, the UE 120 may access the WAN 140 via a TRP 110.

The location server 130 may comprise a server and/or other computing device configured to determine an estimated location of UE 120 and/or provide data (e.g., "assistance data") to UE 120 to facilitate the location determination. According to some embodiments, location server 130 may comprise a Secure User Plane Location (SUPL) Location Platform (SLP), which may support the SUPL user plane (UP) location solution defined by the Open Mobile Alliance (OMA) and may support location services for UE 120 based on subscription information for UE 120 stored in location server 130. The location server 130 may also comprise an Enhanced Serving Mobile Location Center (E-SMLC) that supports location of UE 120 using a control plane (CP) location solution for LTE radio access by UE 120. The location server 130 may further comprise a Location Management Function (LMF) that supports location of UE 120 using a control plane (CP) location solution for 5G or NR radio access by UE 120. In a CP location solution, signaling to control and manage the location of UE 120 may be exchanged between elements of WAN 140 and with UE 120 using existing network interfaces and protocols and as signaling from the perspective of WAN 140. In a UP location solution, signaling to control and manage the location of UE 120 may be exchanged between location server 130 and UE 120 as data (e.g. data transported using the Internet Protocol (IP) and/or Transmission Control Protocol (TCP)) from the perspective of WAN 140.

It can be further noted that, in some embodiments of a terrestrial positioning system 100, the location server 130 may be executed by and/or incorporated into the UE 120 itself. That is, in the embodiments described herein, the functionality of the location server 130 may be performed by the UE 120. In such instances, communication between the UE and location server as described in the following embodiments may therefore occur between hardware and/or software components of the UE 120 itself. Similarly, the functions of the location server 130 described herein may be performed by a TRP 110 or other device communicatively coupled to the terrestrial positioning system 100.

The terrestrial positioning system 100 can determine the location of the UE 120 by exploiting both DL information transmitted by TRPs 110 and UL information transmitted by the UE 120. As explained in more detail below, positioning methods can include Round-Trip-Time measurements (RTT) from multiple TRPs (known as multi-RTT), Uplink Time Difference Of Arrival (UTDOA), and/or other techniques that determine respective distances 150-1, 150-2, and 150-3 (collectively and generically referred to herein as distances 150) from TRPs 110 to determine the location of the UE 120 using multilateration or similar algorithms. In multilateration, for example, distances 150-1, 150-2, and 150-3 trace respective circles 160-1, 160-2, and 160-3, and the location of the UE 120 may be determined as the intersection of these circles 160. As discussed in more detail below, embodiments provided herein are generally directed toward positioning techniques in which there is a reciprocity scenario (e.g. utilizing DL and UL information), in which the SNR is larger in one direction than the other.

Figure 2:
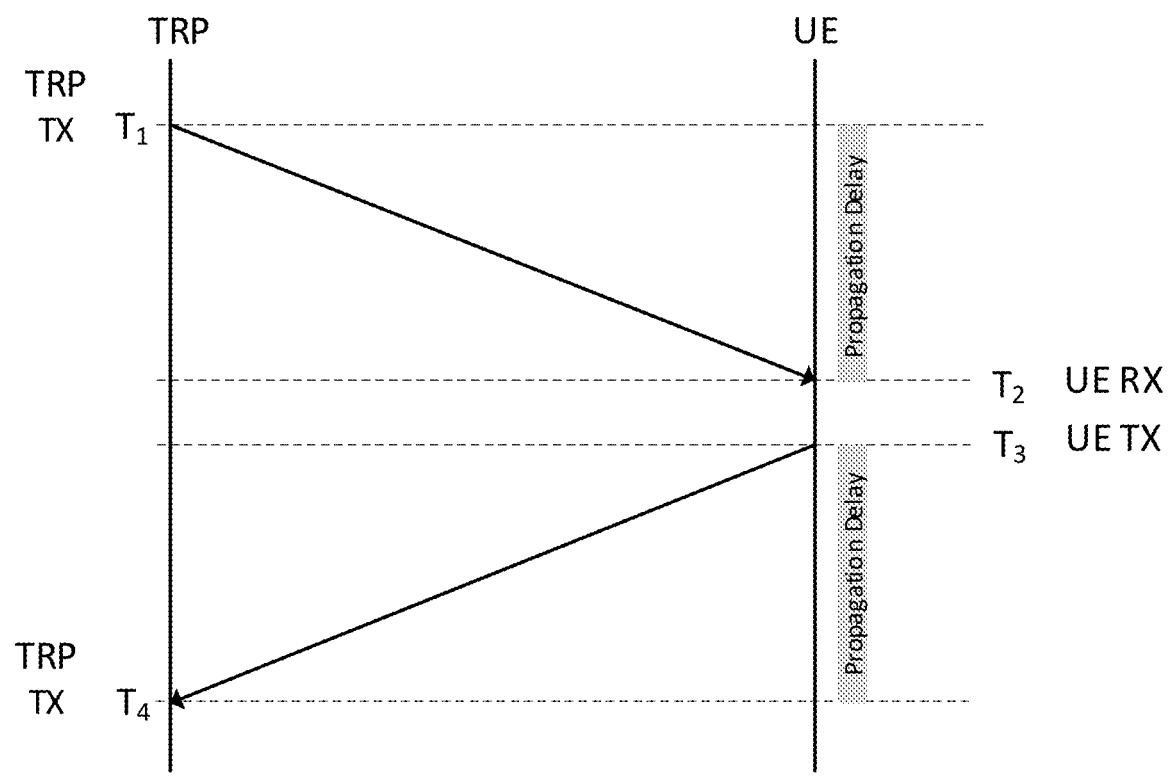
FIG. 2 is a timing diagram illustrating a measurement used in position determination according to an embodiment.

FIG. 2 is a timing diagram illustrating the basic steps of an RTT measurement, with which a multi-RTT position determination can be determined, and which may be utilized in the embodiments provided herein as described in more detail below. Here, a TRP 110 transmits a DL Reference Signal (RS) at a first time, $T_1$, which propagates to the UE 120. At a second time, $T_2$, the DL RS arrives at the UE 120. The UE 120 then transmits an UL RS at a third time, $T_3$. Finally, the UL RS is received and measured by the TRP 110 at a fourth time, $T_4$. In some embodiments, DL RS (the TRP TX in FIG. 2) and/or the UL RS (the UE RX in FIG. 2) may be broadcast so that multiple recipients (UEs or TRPs, respectively) receive the RS, thereby enabling multiple RTT measurements to be made simultaneously. Additionally or alternatively, RTT measurements may be dedicated between a single TRP-UE pair.

The distance 150, d, between the TRP 110 and the UE 120 can then be determined using the following equation:

$$\frac{2d}{c} = (T_4 - T_1) - (T_3 - T_2) = (T_4 - T_1) + (T_2 - T_3) \qquad (1)$$

Although techniques described herein may be used to enhance multi-RTT position determination, embodiments are not so limited. Embodiments may additionally or alternatively enhance positioning based on Uplink Time-Difference-Of-Arrival (UTDOA).

In UTDOA, UL signals from the UE are used to measure the time difference of arrival of the UL signal at multiple TRPs at different locations in range of the UL signal. These TRPs may comprise, for example, base stations of a cellular network and/or at a Location Measurement Units (LMUs) (the latter of which may be located internal or external to cellular base stations). (The position calculations in either configuration or implementation remain the same.) In some implementations of UTDOA the UL signal may be a Sounding Reference Signal (SRS) comprising a frequency-domain reference signal sequence, derived from a Zadoff-Chu sequence, that occupies at least one Orthogonal Frequency Division Multiplexing (OFDM) symbol in a subframe.

In some implementations of UTDOA, DL signals from TRPs may also be used. For example, the UL signal (e.g., an SRS) sent by the UE can have a downlink signal as a Quasi Co-Located (QCL) source signal. (A QCL source can be used to extract long-term statistics of the channel that are related with the UL transmission.) DL signals of QCL type A or C (which can be used, for example, to derive delay spread, average delay, Doppler spread, average Doppler, and/or spatial Tx beam of the reciprocal channel), in particular, can be used as reference DL signals for estimating a number of distinct paths, a number of complex sinusoids, and/or a quality metric of the wireless channel, as used in the techniques described herein below. (A QCL source signal may comprise, for example, a Position Reference Signal (PRS). Other types of QCL source signals may be used additionally or alternatively, such as Synchronization Signal Block (SSB), Channel State Information Reference Signal (CSI-RS), or the like. As a person of ordinary skill in the art will appreciate, a QCL type is a type of association between the DL signal and a corresponding UL signal.) According to some embodiments, the QCL source signal may be received by the UE during a positioning session with a location server.

Super-resolution TOA algorithms can use spectral estimation to accurately achieve a higher resolution (i.e., a higher accuracy of the location of the UE 120) than traditional algorithms. Put generally, spectral estimation can enable algorithms to anticipate the shape of a received waveform to more accurately determine a TOA. These types of spectral estimation can include known algorithms, such as MUSIC, ESPRIT, and Matrix Pencil, which exploit an underlying structure including a limited set of time-domain paths and/or limited sets of angles.

Figure 4:
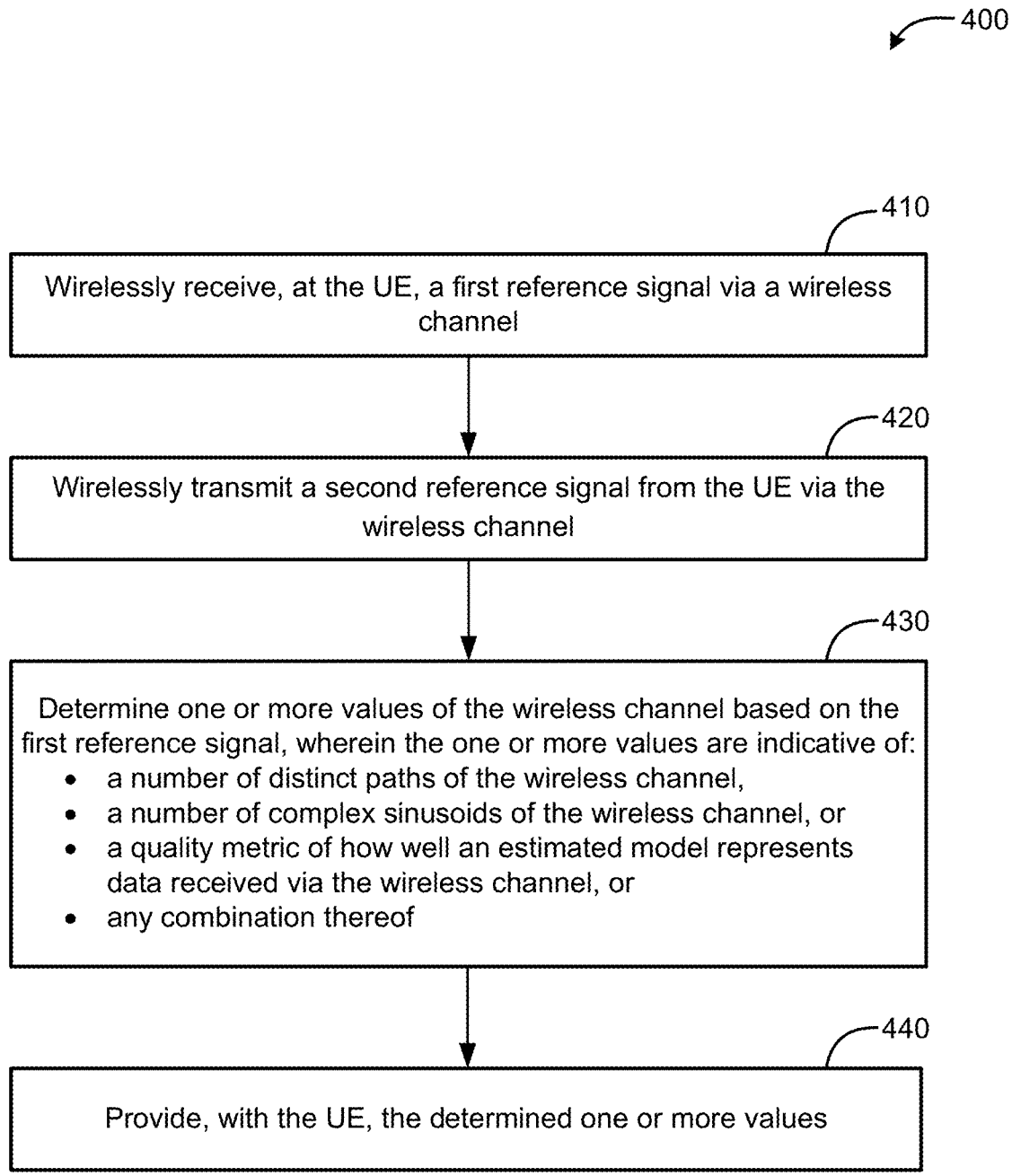
FIG. 4 is a flow diagram of a method at a UE of enhanced reciprocal RTT-based or UTDOA-based positioning, according to an embodiment.

Because the determination of parameters for super-resolution models can be impacted by noise, the accuracy of these super-resolution algorithms may be limited primarily by the available SNR and the model accuracy. FIG. 4 helps illustrate how SNR can impact the accuracy of these super-resolution algorithms.

Figure 3:
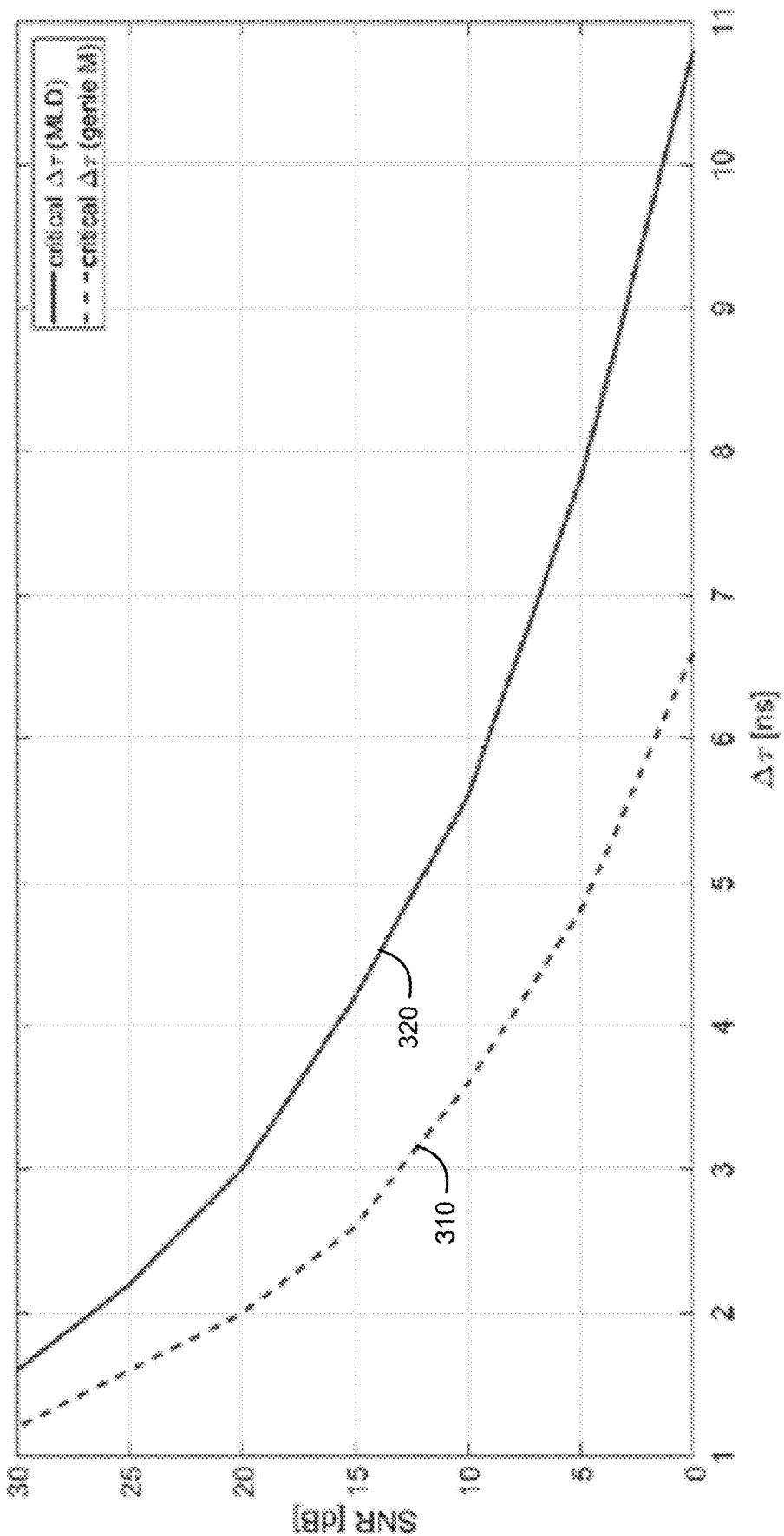
FIG. 3 is a graph illustrating how decreased SNR can result in decreased resolution of super-resolution algorithms, and how parameter selection can improve performance.

FIG. 3 is a graph illustrating how decreased SNR can result in decreased resolution of super-resolution algorithms, and how parameter selection can improve performance. Here, matrix pencil and ESPRIT algorithms reconstruct Channel Frequency Response (CFR) from a finite number, M, of multipath components (complex sinusoids), which is chosen. The case where M is known (genie M, line 310 in FIG. 3) has higher resolution than the case where the Maximum Likelihood Detector (MLD) (an estimation of M) is used (line 320 in FIG. 3). At the bottom of the graph, for example (where SNR is 0 DB), resolution where M is known is at 6.5 ns, whereas resolution is closer to 11 ns in the case where M is estimated.

This relationship between M and SNR can further be leveraged to estimate M accurately in channels with high SNR. As a person of ordinary skill the art will appreciate, hypothesis testing can be used, for example, to determine a Mean Square Error (MSE) of data received corresponding to each of a plurality of hypothetical values for M. The value for M can then be chosen based on the value resulting in the smallest MSE. This technique for selecting the value of M, however, may be less effective when SNR is low. Therefore, it may be preferable to select a value of M using a signal having a relatively high SNR. As described in further detail below, embodiments use this relationship between M and SNR to improve the determination of M, resulting in a more accurate multi-RTT and UTDOA position determination. As a person of ordinary skill in the art will appreciate, parameters similar to M (such as the number of distinct paths, which can be different than M) have a similar relationship with SNR and may be obtained in a similar manner.

In brief, because multi-RTT and UTDOA super-resolution algorithms depend on the quality of estimating the TOA in both UL and DL links (directions in the wireless channel), if one link has lower quality (SNR) then the other, it would result in an error floor (and even if a better quality existed the other link). However, according to embodiments, techniques for position estimation using UL and DL signals can be enhanced by leveraging information (e.g., the estimated number of complex sinusoids and/or distinct paths) obtained from the signal having the stronger SNR. That is, because position estimates using UL and DL signals have full or partial reciprocity, the number of paths and/or complex sinusoids that are expected to be present in one link would be the same as the number of paths and/or complex sinusoids in the other. Additional details are provided herein below.

In addition or as an alternative to determining one or more values indicative of the number of paths and/or complex sinusoids based on the link having the stronger SNR, embodiments may determine a quality metric (indicative of how well the estimated model represents the data) for the stronger-SNR link. That is, in instances in which the UE is able to determine a relatively good parameterization of the model of the wireless channel for the DL signal, this information can be shared with the base station or location server to parameterize the model of the wireless channel for the UL signal. In order to determine whether the parameterization of the model used by the UE can also be used in the UL signal, the UE can determine a quality metric for the model and it to the location server or TRP. This quality metric can be compared with a threshold value and/or a quality metric received from a TRP that received the UL signal from the UE. This quality metric may comprise, for example, a normalized MSE value or the like.

According to some embodiments, the one or more values determined by the UE indicative of the number of distinct paths, number of complex sinusoids, and/or a quality metric may be propagated throughout a terrestrial positioning system in any of a variety of ways, depending on desired functionality. For example, the UE may provide the one or more values to the location server, which can forward this information to the TRPs so that the TRPs can make the appropriate estimation of the wireless channel through which the UL reference signal for RTT or UTDOA measurements is sent. In other embodiments, the UE may send this information directly to the TRPs. For TRPs comprising a cellular base stations (e.g., LTE and/or 5G NR base stations), the UE may have a direct communication link with a serving base station, and may therefore send the one or more values to the serving base station. The serving base station can then propagate the values to neighboring base stations using separate signaling. Additionally or alternatively, the UE may send the one or more values to the location server, which can forward the one or more values to the serving base station, which can then forward the one or more values to neighboring base stations. Alternative embodiments may use additional or alternative propagation techniques along these lines. RTT or UTDOA measurements taken by the base stations can then be sent to the location server to determine the location of the UE.

The determination to obtain the one or more values indicative of the number of distinct paths, number of complex sinusoids, and/or a quality metric may vary, depending on desired functionality. For example, a TRP that determines that SNR from signals transmitted via UE is below a certain threshold may, for example, request that the UE provide the one or more values. If the TRP has a direct communication link to the UE, then the TRP can request the one or more values directly. If not, the TRP may send a request to the location server, which can then configure the UE to provide the one or more values (which may then be provided to the location server and forwarded to the requesting TRP). Additionally or alternatively, SNR values of UL signals and/or DL signals sent via the wireless channel between a TRP and a UE may be sent to a location server, which can then configure the UE to provide the one or more values, if SNR values of the UL signal from the UE fall below a certain threshold and/or a difference between the UL and DL SNR values exceeds a certain threshold.

According to some embodiments, the techniques described herein can be used for sidelink positioning. That is, rather than conducting multi-RTT of a UE using RTT measurements from immobile TRPs alone, one or more RTT measurements may be made between the UE and one or more other UEs. (In such RTT measurements, the "TRP" in the illustration of the RTT exchange shown in FIG. 2 and described above may comprise a UE.) Here, the SNR of the reference signal sent from one UE might be better than the SNR of the reference signal sent by another. (Similar to the situation with mobile TRPs, the SNR of one reference signal might be better if the UE transmitting the reference signal sends a stronger reference signal transmission than the other UE.) In such embodiments, for an RTT measurement between two UEs, if it is determined that the reference signal received by a first UE from a second UE has a higher SNR than a reference signal sent by the first UE and received by the second UE, the first UE will determine the number of distinct paths, the number of complex sinusoids, or a quality metric of the reference signal received from the second UE. The first UE can then send one or more values indicative of the number of distinct paths, number of complex sinusoids, and/or quality metric to the second UE, so the second UE can use a super-resolution algorithm for TOA estimation of the reference signal. The determination of which reference signal has the higher SNR can be made, for example, based on a determined SNR from previous communications between the two UEs (e.g., a previous RTT measurement attempt). According to some embodiments, a UE that determines it has a lower SNR (or an SNR below a certain threshold) may request the one or more values indicative of the number of distinct paths, number of complex sinusoids, and/or quality metric from the other UE.

It can be noted that embodiments may not only use the techniques disclosed herein for Time Division Duplex (TDD) communication, but may additionally or alternatively use the techniques in Frequency Division Duplex (FDD) communication. That is, even in cases where DL and UL signals (or reference signals sent from two different UEs) are sent using different frequencies, the techniques described herein may still be utilized in some instances, due to the partial reciprocity rule. This is because the physical channel between the UE and TRP (or two UEs) is largely the same (assuming little movement between DL and UL signals), and because FDD communication may involve two similar frequencies or frequency blocks (e.g., component carriers) that are similarly affected by the physical channel partial reciprocity exists. This means that the number of distinct paths, number of complex sinusoids, and/or a quality metric of a DL signal (or first UE reference signal) having a first component carrier, CC1, may be used for a UL signal (or second UE reference signal) having a second component carrier, CC2, if the difference in frequency between CC1 and CC2 is below a certain threshold difference.

According to some embodiments, the one or more values indicative of the number of distinct paths, number of complex sinusoids, or quality metric (as described in the embodiments above) may be sent for each DL PRS resource, each resource set, and/or each TRP received by the UE. Additionally or alternatively, the one or more values may be sent for each receiver antenna of the receiving UE. The frequency and/or amount of reporting of these values may be set by a location server.

Because of the partial reciprocity in FDD, the one or more values provided by the UE may differ from values provided in the case of TDD. For example, rather than providing a value indicative of the number of paths, a UE may provide one or more values to convey a maximum and/or minimum number of paths (e.g., up to Paths, no less than Y paths, between X and Y paths, etc.).

FIG. 4 is a flow diagram of a method 400 at a UE of enhanced reciprocal RTT-based or UTDOA-based positioning, according to an embodiment. That is, the functionality of the blocks illustrated in FIG. 4 describe the UE-side functionality, according to embodiments, to enhance multi-RTT or UTDOA positioning using a wireless channel having full or partial reciprocity.

It can be noted that, as with figures appended hereto, FIG. 4 is provided as a non-limiting example. Other embodiments may vary, depending on desired functionality. For example, the functional blocks illustrated in method 400 may be combined, separated, or rearranged to accommodate different embodiments. The method 400 may be performed by a UE such as the UE 120 illustrated in FIG. 1 and described above. Means for performing the functionality of method 400 may include hardware and/or software means of the UE, such as the hardware and/or software components of the UE 600 illustrated in FIG. 6 and described in detail below.

At block 410, the functionality comprises wireless receiving, at the UE, at first reference signal. In some embodiments, the first reference signal can comprise a DL reference signal from a TRP or an RTT reference signal (e.g., a signal associated with an RTT positioning procedure). As indicated in the embodiments above, an RTT reference signal may comprise an initial RTT measurement signal from a TRP (e.g., a base station or a second UE) used to measure the TOA from the TRP and sent at a first time (e.g., T1 of FIG. 2). As noted, in some embodiments, the first reference signal may comprise a QCL source (e.g., type C or A) for the respective UTDOA reference signal or RTT response signal. A QCL type C or type A source may comprise a PRS, SSB, or CSI-RS, for example. Means for performing the functionality at block 410 may comprise software and/or hardware components of a UE, such as the bus 605, processing unit(s) 610, DSP 620, wireless communication interface 630, memory 660, and/or other components of the UE 600 illustrated in FIG. 6 and described in more detail below.

The functionality at block 420 comprises, wirelessly transmitting a second reference signal from the UE via the wireless channel. As noted, the second reference signal may comprise a reference signal associated with either a UTDOA positioning procedure or an RTT positioning procedure. Moreover, this may be in response to wirelessly receiving the first reference signal comprising a respective DL reference signal or RTT reference signal. As previously explained, an RTT response signal (e.g., sent at time T3 and FIG. 2) may be responsive to an RTT reference signal, allowing for an RTT measurement to be made by the receiving TRP that sent the RTT reference signal. The UTDOA reference signal, if transmitted, may be received not only by the base station transmitting the DL reference signal, but by other base stations to allow for positioning via multilateration. (It can be noted that, in some embodiments, the UTDOA reference signal may be transmitted in response to DL reference signals transmitted by other base stations as well.) Means for performing the functionality at block 420 may comprise software and/or hardware components of a UE, such as the bus 605, processing unit(s) 610, DSP 620, wireless communication interface 630, memory 660, and/or other components of the UE 600 illustrated in FIG. 6 and described in more detail below.

At block 430, the functionality comprises determining one or more values of the wireless channel based on the first reference signal, where the one or more values are indicative of a number of distinct paths of the wireless channel, a number of complex sinusoids of the wireless channel, or a quality metric of how well an estimated model represents data received via the wireless channel, or any combination thereof. As noted, SNR for the first reference signal may be higher than SNR for the second reference signal at the receiving entity. And thus, the one or more values determined in block 430 may be more accurately determined than corresponding values from the second reference signal. In some embodiments, a location server may preconfigure the UE to determine the one or more values. As such, in some embodiments, the determining the one or more values is further based on a request received by the UE from a location server. As a point of clarification, however, the location server may be executed by the UE itself, or another device, such as a server, a base station, or other device connected to the terrestrial positioning system.

As previously indicated, in some embodiments, the one or more values may be indicative of a range, in addition or as an alternative to a specific number. That is, in some embodiments the one or more values are indicative of a maximum number of distinct paths of the wireless channel, a maximum number of complex sinusoids of the wireless channel, a minimum number of distinct paths of the wireless channel, or minimum number of complex sinusoids of the wireless channel, or any combination thereof.

Means for performing the functionality at block 430 may comprise software and/or hardware components of a UE, such as the bus 605, processing unit(s) 610, memory 660, and/or other components of the UE 600 illustrated in FIG. 6 and described in more detail below.

At block 440, the functionality comprises providing, with the UE, the determined one or more values. As previously explained, the propagation of the one or more values may be executed in any of a variety of ways, depending on desired functionality. For example, although the UE comprise the location server itself, these values may still be sent to a TRP that sent the first reference signal (e.g., a base station or second UE), either directly or via a WAN or other network. Where the location server is executed on another device, the UE may send the one or more values to the location server, which may then forward the values to the TRP that transmitted the first reference signal. In some embodiments, the UE may provide these values directly to the TRP that transmitted the first reference signal, e.g. in a companion file/file set sent to the TRP in association with an RTT measurement. For instances in which the location server is executed by the UE, these values may be provided to the location server by a separate process executed by the UE.

Means for performing the functionality at block 440 may comprise software and/or hardware components of a UE, such as the bus 605, processing unit(s) 610, DSP 620, wireless communication interface 630, memory 660, and/or other components of the UE 600 illustrated in FIG. 6 and described in more detail below.

Figure 5:
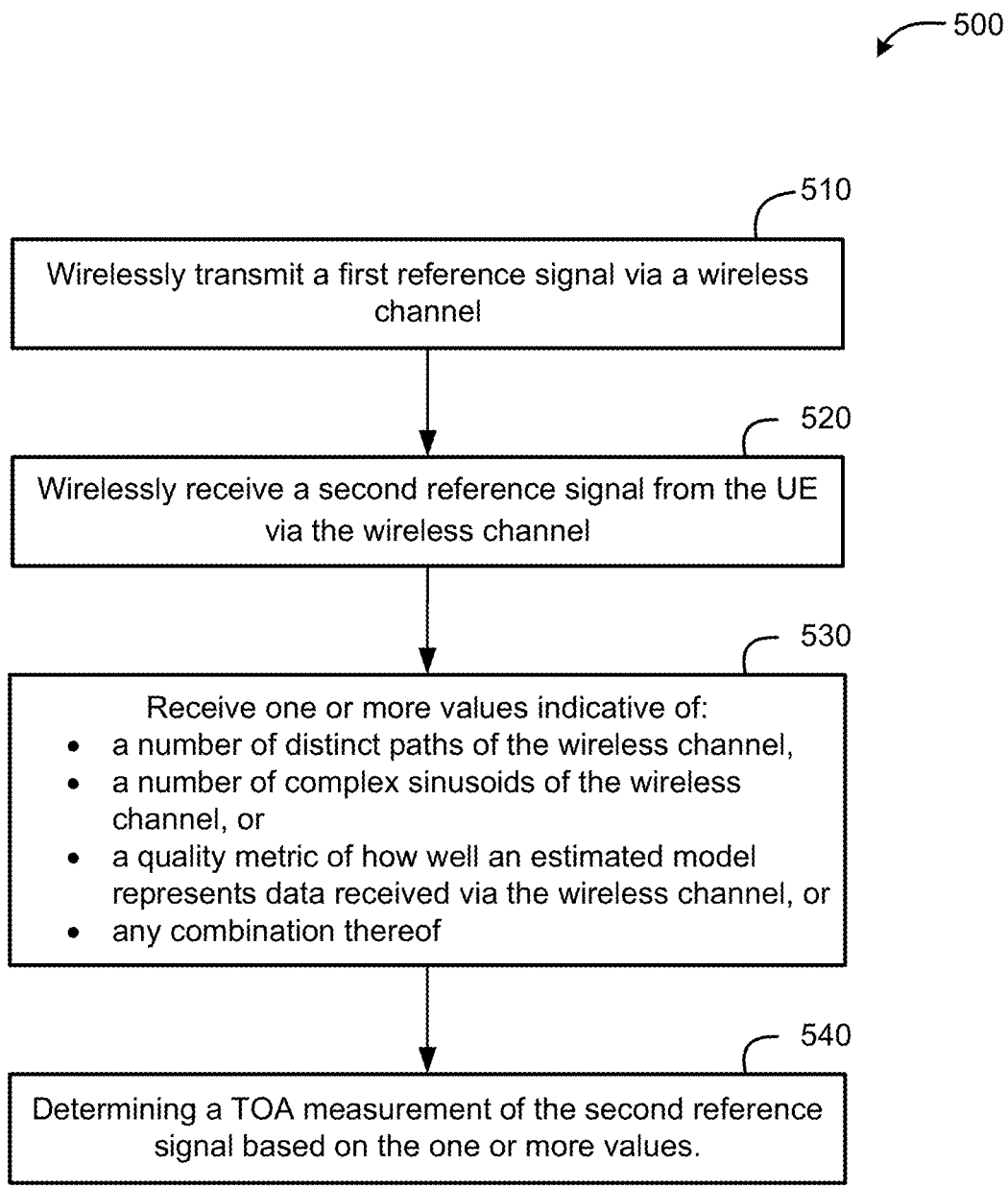
FIG. 5 is a flow diagram of a method at a terrestrial transceiver for enhanced reciprocal RTT- or UTDOA-based positioning of a UE, according to an embodiment.

FIG. 5 is a flow diagram of a method 500 at a TRP for enhanced reciprocal RTT- or UTDOA-based positioning of a UE, according to an embodiment. That is, the functionality of the blocks illustrated in FIG. 5 describe the TRP-side functionality, according to embodiments, to enhance multi-RTT or UTDOA-based positioning using a wireless channel having full or partial reciprocity. As noted above, the TRP may comprise a base station or a second UE.

It can be noted that, as with figures appended hereto, FIG. 5 is provided as a non-limiting example. Other embodiments may vary, depending on desired functionality. For example, the functional blocks illustrated in method 500 may be combined, separated, or rearranged to accommodate different embodiments. The method 500 may be performed by a TRP such as the TRPs 110 illustrated in FIG. 1 and described above. Means for performing the functionality of method 500 may include hardware and/or software means of a UE or base station, such as the hardware and/or software components of the UE 600 illustrated in FIG. 6 or base station 700 illustrated in effigy. 7, both of which are described in detail below.

At block 510, the functionality comprises wirelessly transmitting a first reference signal via the wireless channel. Again, the first reference signal may comprise an RTT reference signal (used to measure a TOA from the TRP) or a DL reference signal. Where the first reference signal comprises the DL reference signal, the DL reference signal may comprise a QCL type C or type A source. Moreover, the QCL type C or type A source may comprise, for example, a PRS, SSB signal, or CSI-RS. Means for performing the functionality at block 510 may comprise software and/or hardware components of a UE, such as the bus 605, processing unit(s) 610, DSP 620, wireless communication interface 630, memory 660, and/or other components of the UE 600 illustrated in FIG. 6 and described in more detail below. Alternatively, for performing the functionality at block 510 may comprise software and/or hardware components of a base station, such as the bus 705, processing unit(s) 710, DSP 720, wireless communication interface 730, memory 760, and/or other components of the base station 700 illustrated in FIG. 7 and described in more detail below.

The functionality at block 520 comprises wirelessly receiving a second reference signal from the UE via the wireless channel. As noted, this may be responsive to transmitting the first reference signal comprising the RTT reference signal or the DL reference signal. In such instances, the second reference signal may respectively comprise a reference signal associated with an RTT positioning procedure or a UTDOA positioning procedure. Means for performing the functionality at block 520 may comprise software and/or hardware components of a UE, such as the bus 605, processing unit(s) 610, DSP 620, wireless communication interface 630, memory 660, and/or other components of the UE 600 illustrated in FIG. 6 and described in more detail below. Alternatively, for performing the functionality at block 520 may comprise software and/or hardware components of a base station, such as the bus 705, processing unit(s) 710, DSP 720, wireless communication interface 730, memory 760, and/or other components of the base station 700 illustrated in FIG. 7 and described in more detail below.

At block 530, the functionality comprises receiving one or more values indicative of a number of distinct paths of the wireless channel, a number of complex sinusoids of the wireless channel, or a quality metric of how well an estimated model represents data received via the wireless channel, or any combination thereof. As noted, these one or more values may be determined by the UE, from the perspective of the UE. In some embodiments, the one or more values may be received via a location server. Thus, in some embodiments, the method 500 may further comprise sending a request for the one or more values to the location server. Moreover, in some embodiments, the one or more values may be received from the UE via a companion file/file set to an RTT measurement from the first/second reference signals.

As previously indicated, in some embodiments, the one or more values may be indicative of a range, in addition or as an alternative to a specific number. That is, in some embodiments the one or more values are indicative of a maximum number of distinct paths of the wireless channel, a maximum number of complex sinusoids of the wireless channel, a minimum number of distinct paths of the wireless channel, or a minimum number of complex sinusoids of the wireless channel, or any combination thereof.

Means for performing the functionality at block 530 may comprise software and/or hardware components of a UE, such as the bus 605, processing unit(s) 610, DSP 620, wireless communication interface 630, memory 660, and/or other components of the UE 600 illustrated in FIG. 6 and described in more detail below. Alternatively, for performing the functionality at block 510 may comprise software and/or hardware components of a base station, such as the bus 705, processing unit(s) 710, DSP 720, wireless communication interface 730, memory 760, and/or other components of the base station 700 illustrated in FIG. 7 and described in more detail below.

At block 540, the functionality comprises determining a TOA measurement of the second reference signal based on the one or more values. As previously indicated, the one or more values may allow for super resolution algorithms to be used for RTT or UTDOA measurements by determining a more accurate TOA than by traditional techniques. Such algorithms, therefore, may make use of the one or more values provided at block 532 provide the more accurate TOA. Means for performing the functionality at block 540 may comprise software and/or hardware components of a UE, such as the bus 605, processing unit(s) 610, DSP 620, memory 660, and/or other components of the UE 600 illustrated in FIG. 6 and described in more detail below. Alternatively, for performing the functionality at block 510 may comprise software and/or hardware components of a base station, such as the bus 705, processing unit(s) 710, DSP 720, memory 760, and/or other components of the base station 700 illustrated in FIG. 7 and described in more detail below.

Figure 6:
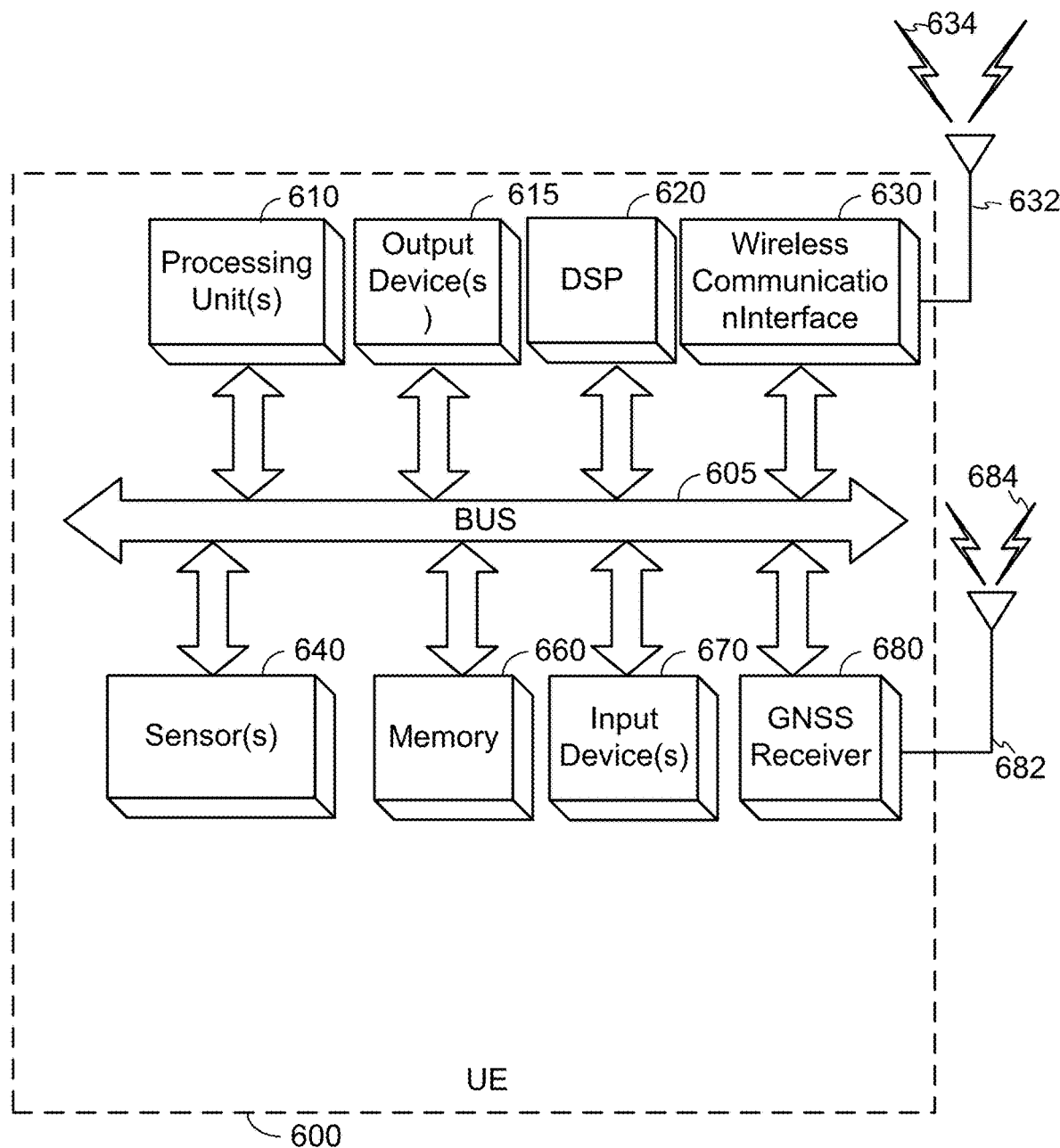
FIG. 6 is a block diagram of a UE, according to an embodiment.

FIG. 6 is a block diagram of an embodiment of a UE 600, which can be utilized as described in the embodiments described herein and in association with FIGS. 1-5. It should be noted that FIG. 6 is meant only to provide a generalized illustration of various components of UE 600, any or all of which may be utilized as appropriate. In other words, because UEs can vary widely in functionality, they may include only a portion of the components shown in FIG. 6. It can be noted that, in some instances, components illustrated by FIG. 6 can be localized to a single physical device and/or distributed among various networked devices, which may be disposed at different physical locations.

The UE 600 is shown comprising hardware elements that can be electrically coupled via a bus 605 (or may otherwise be in communication, as appropriate). The hardware elements may include a processing unit(s) 610 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 6, some embodiments may have a separate DSP 620, depending on desired functionality. The UE 600 also may comprise one or more input devices 670, which may comprise without limitation one or more touch screens, touch pads, microphones, buttons, dials, switches, and/or the like; and one or more output devices 615, which may comprise without limitation, one or more displays, light emitting diodes (LEDs), speakers, and/or the like.

The UE 600 might also include a wireless communication interface 630, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, cellular communication facilities, etc.), and/or the like, which may enable the UE 600 to communicate via the networks described herein with regard to FIG. 1. The wireless communication interface 630 may permit data to be communicated with a network, base stations (e.g., eNBs, ng-eNBs, and/or gNBs), and/or other network components, computer systems, TRPs, and/or any other electronic devices described herein. The communication can be carried out via one or more wireless communication antenna(s) 632 that send and/or receive wireless signals 634.

Depending on desired functionality, the wireless communication interface 630 may comprise separate TRPs to communicate with base stations (e.g., eNBs, ng-eNBs and/or gNBs) and other terrestrial TRPs, such as wireless devices and access points. The UE 600 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (WCDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, New Radio (NR) and so on. 5G, LTE, LTE Advanced, NR, GSM, and WCDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 600 can further include sensor(s) 640. Such sensors may comprise, without limitation, one or more inertial sensors (e.g., accelerometer(s), gyroscope(s), and or other Inertial Measurement Units (IMUs)), camera(s), magnetometer(s), compass, altimeter(s), microphone(s), proximity sensor(s), light sensor(s), barometer, and the like, some of which may be used to complement and/or facilitate the functionality described herein.

Embodiments of the UE 600 may also include a Global Navigation Satellite System (GNSS) receiver 680 capable of receiving signals 684 from one or more GNSS satellites using an GNSS antenna 682 (which may be combined in some implementations with antenna(s) 632). Such positioning can be utilized to complement and/or incorporate the techniques described herein. The GNSS receiver 680 can extract a position of the UE 600, using conventional techniques, from GNSS satellites of an GNSS system, such as Global Positioning System (GPS), Galileo, GLObal NAvigation Satellite System (GLONASS), Compass, Quasi-Zenith Satellite System (QZSS) over Japan, Indian Regional Navigational Satellite System (IRNSS) over India, Beidou over China, and/or the like. Moreover, the GNSS receiver 680 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

The UE 600 may further include and/or be in communication with a memory 660. The memory 660 may comprise, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 660 of the UE 600 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the UE 600 (e.g., using processing unit(s) 610). In an aspect, then, such code and/or instructions can be used to configure and/or adapt a general purpose computer (or other device) to perform one or more operations in accordance with the described methods.

Figure 7:
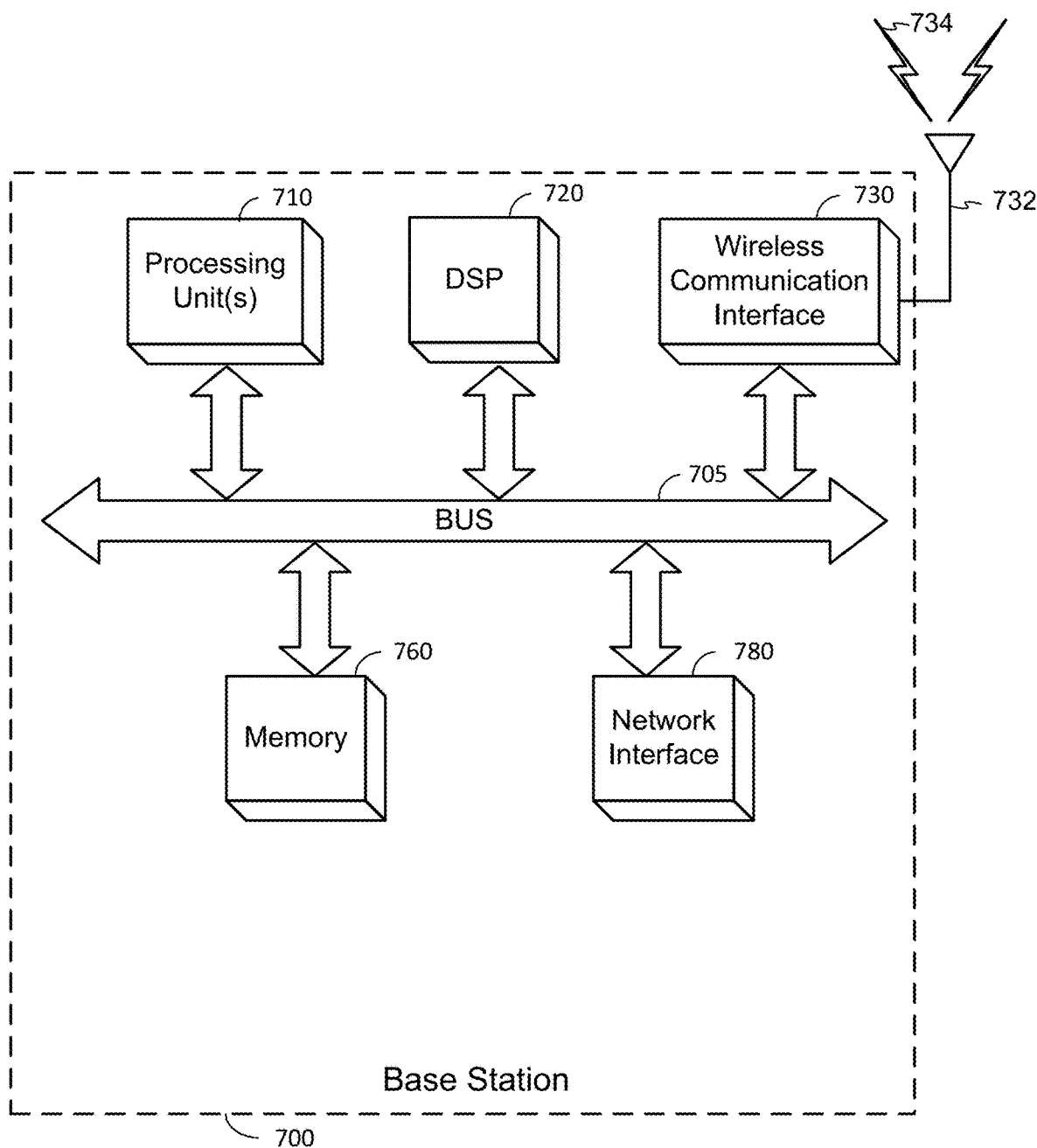
FIG. 7 is a block diagram of a base station, according to an embodiment.

FIG. 7 illustrates an embodiment of a base station 700, which can be utilized as described herein above (e.g., in association with FIGS. 1-5). For example, the base station 700 can perform one or more of the functions of method 500 of FIG. 5. It should be noted that FIG. 7 is meant only to provide a generalized illustration of various components, any or all of which may be utilized as appropriate. In some embodiments, the base station 700 may correspond to a gNB, an ng-eNB, and/or an eNB.

The base station 700 is shown comprising hardware elements that can be electrically coupled via a bus 705 (or may otherwise be in communication, as appropriate). The hardware elements may include a processing unit(s) 710 which can include without limitation one or more general-purpose processors, one or more special-purpose processors (such as DSP chips, graphics acceleration processors, ASICs, and/or the like), and/or other processing structure or means. As shown in FIG. 7, some embodiments may have a separate DSP 720, depending on desired functionality. Location determination and/or other determinations based on wireless communication may be provided in the processing unit(s) 710 and/or wireless communication interface 730 (discussed below), according to some embodiments. The base station 700 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 700 might also include a wireless communication interface 730, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMAX device, cellular communication facilities, etc.), and/or the like, which may enable the base station 700 to communicate as described herein. The wireless communication interface 730 may permit data and signaling to be communicated (e.g. transmitted and received) UEs, other base stations (e.g., eNBs, gNBs, and ng-eNBs), and/or other network components, computer systems, and/or any other electronic devices described herein. The communication can be carried out via one or more wireless communication antenna(s) 732 that send and/or receive wireless signals 734.

The base station 700 may also include a network interface 780, which can include support of wireline communication technologies. The network interface 780 may include a modem, network card, chipset, and/or the like. The network interface 780 may include one or more input and/or output communication interfaces to permit data to be exchanged with a network, communication network servers, computer systems, and/or any other electronic devices described herein.

In many embodiments, the base station 700 may further comprise a memory 760. The memory 760 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 760 of the base station 700 also may comprise software elements (not shown in FIG. 7), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 760 that are executable by the base station 700 (and/or processing unit(s) 710 or DSP 720 within base station 700). In an aspect, then, such code and/or instructions can be used to configure and/or adapt a general purpose computer (or other device) to perform one or more operations in accordance with the described methods.

Figure 8:
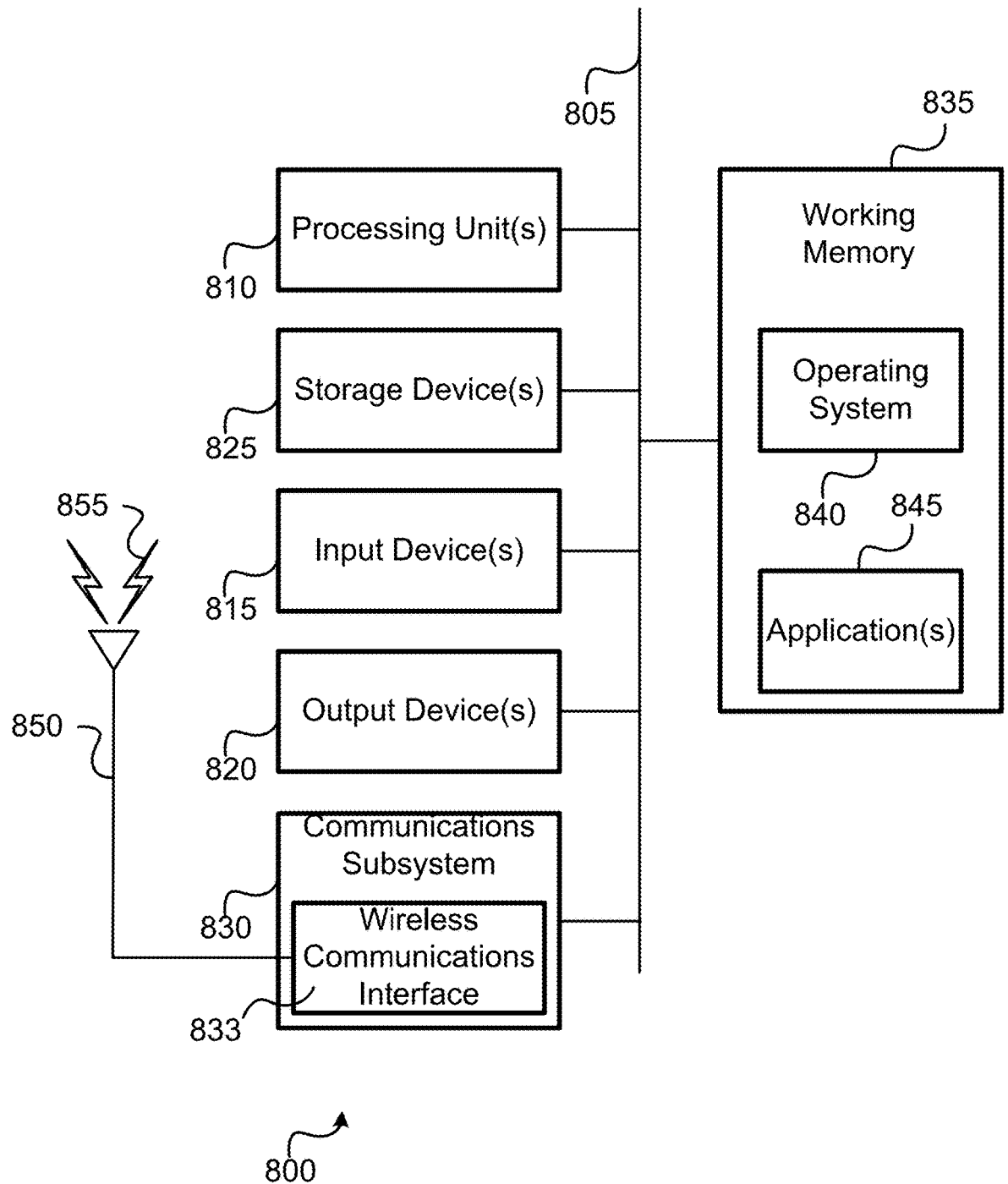
FIG. 8 is a block diagram of an embodiment of a computer system.

FIG. 8 is a block diagram of an embodiment of a computer system 800, which may be used, in whole or in part, to provide the functions of one or more network components as described in the embodiments herein (e.g., location server 130 of FIG. 1). It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner. In addition, it can be noted that components illustrated by FIG. 8 can be localized to a single device and/or distributed among various networked devices, which may be disposed at different geographical locations.

The computer system 800 is shown comprising hardware elements that can be electrically coupled via a bus 805 (or may otherwise be in communication, as appropriate). The hardware elements may include processing unit(s) 810, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 800 also may comprise one or more input devices 815, which may comprise without limitation a mouse, a keyboard, a camera, a microphone, and/or the like; and one or more output devices 820, which may comprise without limitation a display device, a printer, and/or the like.

The computer system 800 may further include (and/or be in communication with) one or more non-transitory storage devices 825, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 800 may also include a communications subsystem 830, which may comprise wireless communication technologies managed and controlled by a wireless communication interface 833, as well as wired technologies (such as Ethernet, coaxial communications, universal serial bus (USB), and the like). The wireless communication interface 833 may send and receive wireless signals 855 (e.g. signals according to 5G NR or LTE) via wireless antenna(s) 850. Thus the communications subsystem 830 may comprise a modem, a network card (wireless or wired), an infrared communication device, a wireless communication device, and/or a chipset, and/or the like, which may enable the computer system 800 to communicate on any or all of the communication networks described herein to any device on the respective network, including a User Equipment (UE), base stations and/or other TRPs, and/or any other electronic devices described herein. Hence, the communications subsystem 830 may be used to receive and send data as described in the embodiments herein.

In many embodiments, the computer system 800 will further comprise a working memory 835, which may comprise a RAM or ROM device, as described above. Software elements, shown as being located within the working memory 835, may comprise an operating system 840, device drivers, executable libraries, and/or other code, such as one or more applications 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as computer system 800. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method at a User Equipment (UE) of enabling enhanced reciprocal signaling-based positioning of the UE, the method comprising:
   wirelessly receiving, at the UE, a first reference signal via a wireless channel, wherein the first reference signal comprises a Quasi Co-Located (QCL) source for a second reference signal;
   wirelessly transmitting the second reference signal from the UE via the wireless channel, wherein the second reference signal comprises a reference signal associated with either a Uplink Time-Difference-Of-Arrival (UTDOA) positioning procedure or an RTT positioning procedure;
   determining one or more values of the wireless channel based on the first reference signal, wherein the one or more values include:
   a number of distinct paths of the wireless channel,
   a number of complex sinusoids of the wireless channel, or
   a quality metric of how well an estimated model represents data received via the wireless channel, or
   any combination thereof; and
   providing, with the UE, the determined one or more values.

2. The method of claim 1, wherein, the first reference signal comprises:
   a downlink (DL) reference signal from a Transmission and Reception Point (TRP), or
   reference signal used to measure a Time-Of-Arrival (TOA) from the TRP for a Round-Trip-Time (RTT) positioning procedure.

3. The method of claim 2, wherein providing the determined one or more values comprises providing the one or more values to the TRP or a location server.

4. The method of claim 3, wherein the location server is executed by the UE.

5. The method of claim 3, wherein the location server is executed on a device distinct from the UE.

6. The method of claim 1, wherein the Quasi Co-Located (QCL) source comprises:
   a position reference signal (PRS),
   a Synchronization Signal Block (SSB) signal, or
   a Channel State Information Reference Signal (CSI-RS).

7. The method of claim 1, wherein the one or more values are indicative of:
   a maximum number of distinct paths of the wireless channel,
   a maximum number of complex sinusoids of the wireless channel,
   a minimum number of distinct paths of the wireless channel, or
   a minimum number of complex sinusoids of the wireless channel, or
   any combination thereof.

8. The method of claim 1, wherein the determining the one or more values is further based on a request received by the UE from a location server.

9. The method of claim 1, wherein:
   the first reference signal is associated with an RTT positioning procedure; and
   the first reference signal is received from a second UE.

10. The method of claim 1, wherein wirelessly transmitting the second reference signal is in response to wirelessly receiving the first reference signal.

11. A method at a Transmission and Reception Point (TRP) of enabling enhanced reciprocal signaling-based positioning of a User Equipment (UE), the method comprising:
    wirelessly transmitting a first reference signal via a wireless channel, wherein the first reference signal comprises a Quasi Co-Located (QCL) source for a second reference signal;
    wirelessly receiving the second reference signal from the UE via the wireless channel, wherein the second reference signal comprises a reference signal associated with either a Uplink Time-Difference-Of-Arrival (UTDOA) positioning procedure or an RTT positioning procedure;
    receiving one or more values including:
    a number of distinct paths of the wireless channel,
    a number of complex sinusoids of the wireless channel, or
    a quality metric of how well an estimated model represents data received via the wireless channel, or
    any combination thereof; and
    determining a Time Of Arrival (TOA) measurement of the second reference signal based on the one or more values.

12. The method of claim 11, wherein, the first reference signal comprises:
    a downlink (DL) reference signal, or
    reference signal used to measure a Time-Of-Arrival (TOA) from the TRP for a Round-Trip-Time (RTT) positioning procedure.

13. The method of claim 11, wherein the TRP comprises a base station or a second UE.

14. The method of claim 11, wherein the QCL source comprises:
    a position reference signal (PRS),
    a Synchronization Signal Block (SSB) signal, or
    a Channel State Information Reference Signal (CSI-RS).

15. The method of claim 11, wherein the one or more values are indicative of:
   a maximum number of distinct paths of the wireless channel,
   a maximum number of complex sinusoids of the wireless channel,
   a minimum number of distinct paths of the wireless channel, or
   a minimum number of complex sinusoids of the first reference signal, or
   any combination thereof.

16. The method of claim 11, further comprising sending a request for the one or more values to a location server.

17. The method of claim 11, further comprising receiving the one or more values from a location server.

18. A device comprising:
   a memory; and
   one or more processing units communicatively coupled with the memory and configured to:
      wirelessly receive, via a wireless communication interface of a User Equipment (UE), a first reference signal via a wireless channel, wherein the first reference signal comprises a Quasi Co-Located (QCL) source for a second reference signal;
      wirelessly transmit, via the wireless communication interface, the second reference signal from the UE via the wireless channel, wherein the second reference signal comprises a reference signal associated with either a Uplink Time-Difference-Of-Arrival (UTDOA) positioning procedure or an RTT positioning procedure;
      determine one or more values of the wireless channel based on the first reference signal, wherein the one or more values include:
         a number of distinct paths of the wireless channel,
         a number of complex sinusoids of the wireless channel, or
         a quality metric of how well an estimated model represents data received via the wireless channel, or
         any combination thereof; and
      provide the determined one or more values.

19. The device of claim 18, wherein, to receive the first reference signal, the one or more processing units are configured to receive:
   a downlink (DL) reference signal from a Transmission and Reception Point (TRP), or
   reference signal used to measure a Time-Of-Arrival (TOA) from the TRP for a Round-Trip-Time (RTT) positioning procedure.

20. The device of claim 19, wherein, to provide the determined one or more values, the one or more processing units are configured to provide the one or more values to the TRP or a location server.

21. The device of claim 20, wherein the one or more processing units are configured to provide the one or more values to the location server, wherein the location server is executed by the UE.

22. The device of claim 20, wherein the one or more processing units are configured to provide the one or more values to the location server, wherein the location server is executed by a device distinct from the UE.

23. The device of claim 19, wherein, to receive the QCL source for the second reference signal, the one or more processing units are configured to receive:
   a position reference signal (PRS),
   a Synchronization Signal Block (SSB) signal, or
   a Channel State Information Reference Signal (CSI-RS).

24. The device of claim 18, wherein, to determine one or more values of the wireless channel, the one or more processing units are configured to determine one or more values indicative of:
   a maximum number of distinct paths of the wireless channel,
   a maximum number of complex sinusoids of the wireless channel,
   a minimum number of distinct paths of the wireless channel, or
   a minimum number of complex sinusoids of the wireless channel, or
   any combination thereof.

25. The device of claim 18, wherein the one or more processing units are configured to determine one or more values of the wireless channel based on a request received by the UE from a location server.

26. The device of claim 18, wherein the one or more processing units are configured to receive the first reference signal from a second UE, and wherein the first reference signal is associated with an RTT positioning procedure.

27. The device of claim 18, wherein the one or more processing units are configured to wirelessly transmit the second reference signal via the wireless communication interface in response to wirelessly receiving, via the wireless communication interface, the first reference signal.

28. A device comprising:
   a memory; and
   one or more processing units communicatively coupled with the memory and configured to:
      wirelessly transmit, via a wireless communication interface of a Transmission and Reception Point (TRP), a first reference signal via a wireless channel, wherein the first reference signal comprises a Quasi Co-Located (QCL) source for a second reference signal;
      wirelessly receive, via a wireless communication interface of the TRP, the second reference signal from a User Equipment (UE) via the wireless channel, wherein the second reference signal comprises a reference signal associated with either a Uplink Time-Difference-Of-Arrival (UTDOA) positioning procedure or an RTT positioning procedure;
      receive one or more values including:
         a number of distinct paths of the wireless channel,
         a number of complex sinusoids of the wireless channel, or
         a quality metric of how well an estimated model represents data received via the wireless channel, or
         any combination thereof; and
      determine a Time Of Arrival (TOA) measurement of the second reference signal based on the one or more values.

29. The device of claim 28, wherein, to receive the first reference signal, the one or more processing units are configured to receive:
   a downlink (DL) reference signal, or
   reference signal used to measure a Time-Of-Arrival (TOA) from the TRP for a Round-Trip-Time (RTT) positioning procedure.

30. The device of claim 28, wherein the device comprises a base station or a second UE.

31. The device of claim 28, wherein the one or more processing units are configured to transmit, as the QCL source:

a position reference signal (PRS),
a Synchronization Signal Block (SSB) signal, or
a Channel State Information Reference Signal (CSI-RS).

32. The device of claim 28, wherein, to receive the one or more values, the one or more processing units are configured to receive a value indicative of:
- a maximum number of distinct paths of the wireless channel,
- a maximum number of complex sinusoids of the wireless channel,
- a minimum number of distinct paths of the wireless channel, or
- a minimum number of complex sinusoids of the first reference signal, or
- any combination thereof.

33. The device of claim 32, wherein the one or more processing units are configured to send a request for the one or more values to a location server.

34. The device of claim 32, wherein the one or more processing units are configured to receive the one or more values from a location server.

* * * * *